Aug. 22, 1967    M. KUZMIK    3,336,700
ABRASIVE BELT SKIVING APPARATUS
Filed Jan. 6, 1965    4 Sheets-Sheet 1

INVENTOR
MICHAEL KUZMIK
BY
HIS ATTORNEYS

Aug. 22, 1967    M. KUZMIK    3,336,700
ABRASIVE BELT SKIVING APPARATUS
Filed Jan. 6, 1965    4 Sheets-Sheet 2

INVENTOR
MICHAEL KUZMIK
BY
HIS ATTORNEYS

Aug. 22, 1967        M. KUZMIK         3,336,700
       ABRASIVE BELT SKIVING APPARATUS
Filed Jan. 6, 1965                    4 Sheets-Sheet 3
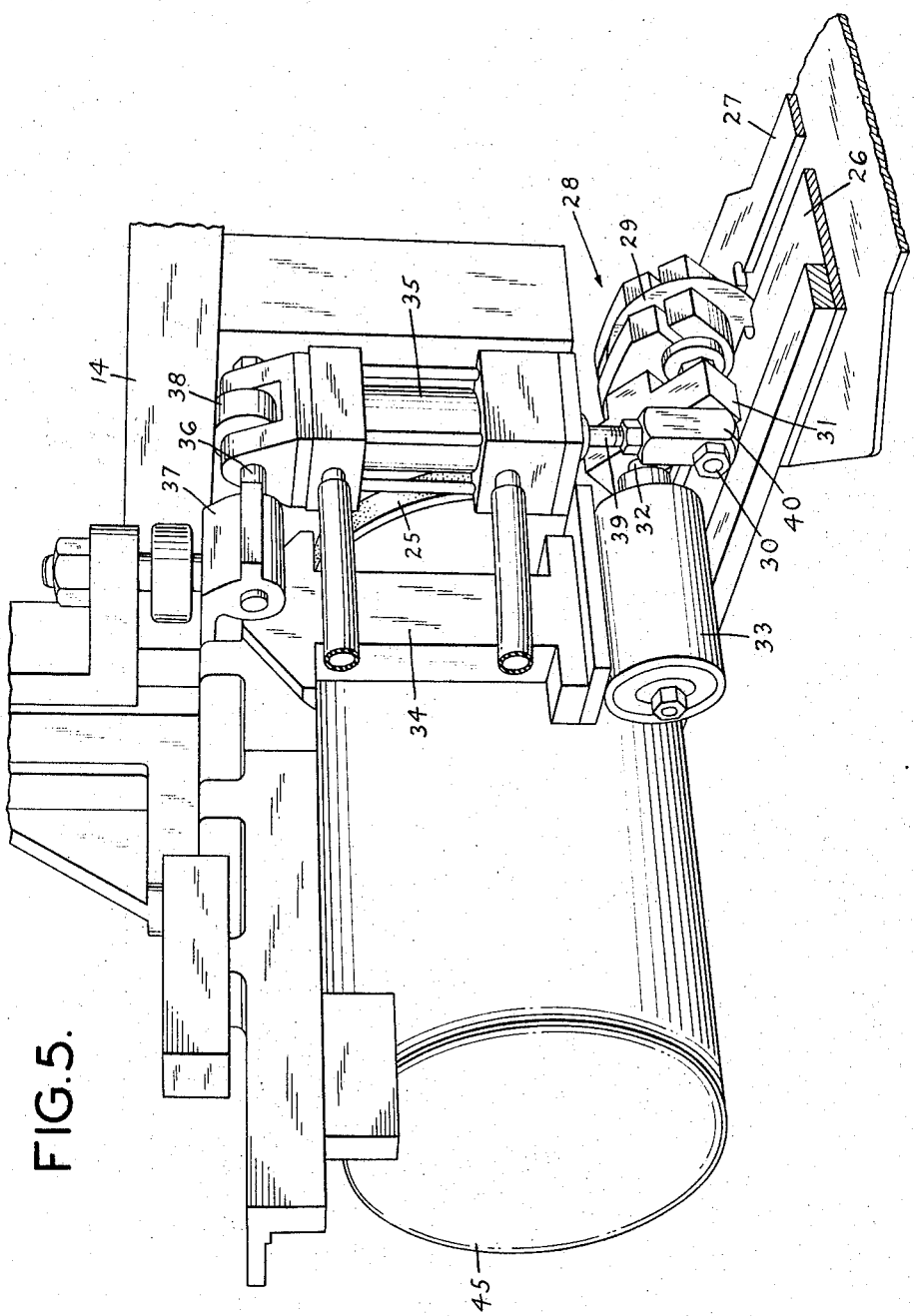
INVENTOR
MICHAEL KUZMIK
BY
HIS ATTORNEYS

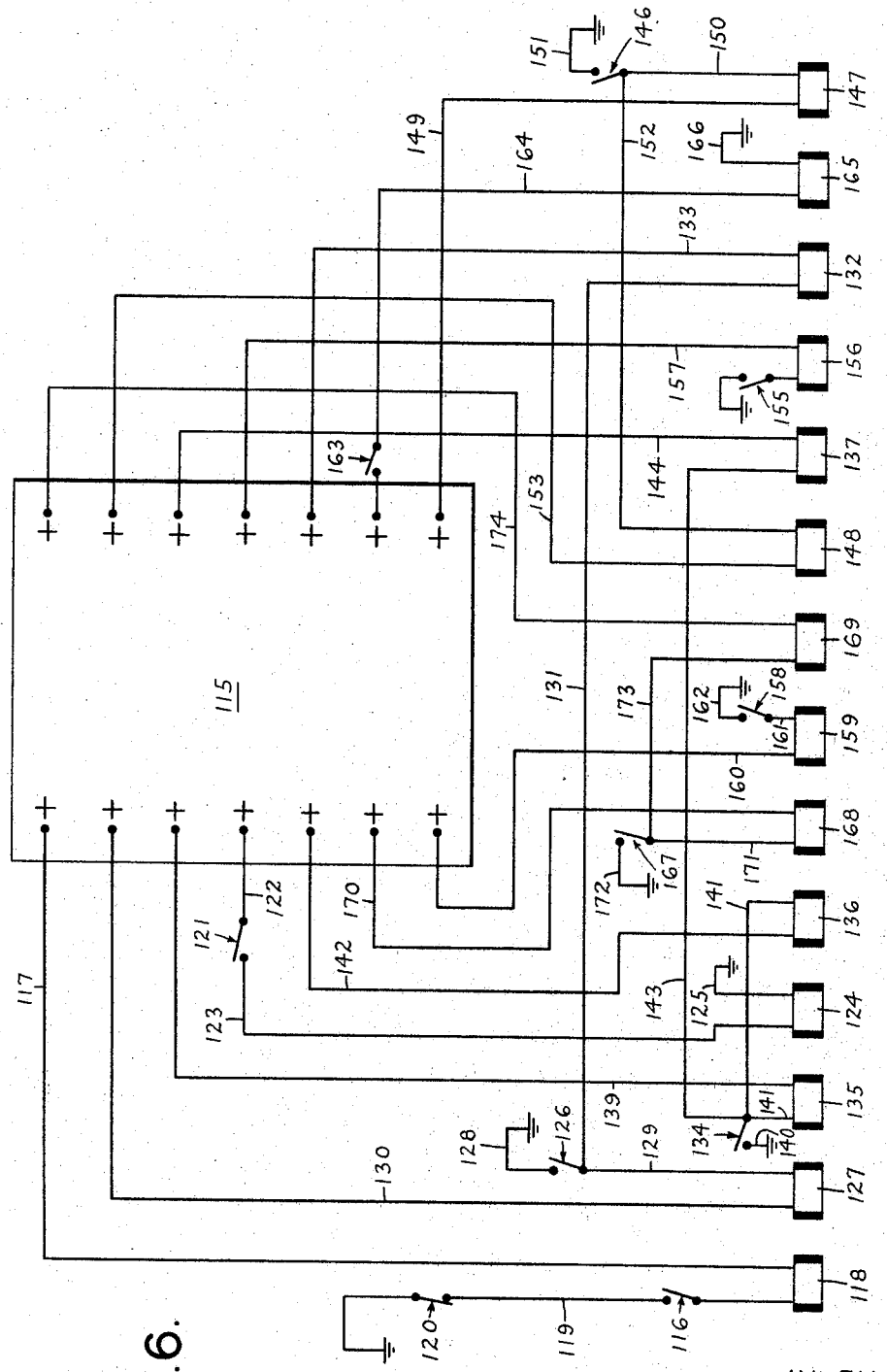

United States Patent Office 3,336,700
Patented Aug. 22, 1967

3,336,700
ABRASIVE BELT SKIVING APPARATUS
Michael Kuzmik, 62 Sprain Valley Road,
Scarsdale, N.Y. 10583
Filed Jan. 6, 1965, Ser. No. 423,704
10 Claims. (Cl. 51—5)

ABSTRACT OF THE DISCLOSURE

This invention relates to apparatus for skiving and cutting abrasive belts of substantially any desired length and includes a carriage having an abrasive skiving wheel and a motor for driving it mounted for movement above a table on which an abrasive belt is supported, the table being provided with holding means for the belt during the skiving operation and the carriage further being provided with a cutter which can be raised and lowered to cut off skived sections of the belt for withdrawal by means of a traveling carriage, the movement of which can be adjusted to draw either long or short portions of the belt across the table and beneath the skiving wheel and including transfer means for removing the cut belts and stacking them on an adjacent support.

This invention relates to apparatus for skiving and cutting abrasive belts for power belt sanders, and more particularly to apparatus for skiving and cutting abrasive belts automatically of almost any desired length. Heretofore, the apparatus for skiving of abrasive belts and cutting them have been manually controlled in that the abrasive belt is fed from rolls or in sheets of a desired length into the skiving machine where the abrasive is removed by means of a power grinder along one or both ends of the belt in order to enable the skived ends to be bonded together by means of a suitable adhesive to produce endless belts. The skived belts are stacked manually and carried away for further processing. In the manual handling of the belts, there is much repetitious, tiresome and costly labor involved in walking to pull the material out to the desired length, walking back to cut the material into belts of desired size, removing the belt from the cutting table and stacking for removal.

In accordance with the present invention, apparatus is provided which not only accurately cuts measured lengths of belts at a considerable saving in costs and time consumed, but permits other operations such as skiving, skuffing and the printing of the direction arrow on the cloth side of the material, simultaneously with the cutting operation and eliminates all of the handling when these operations are done separately.

More particularly, in accordance with the present invention, an apparatus is provided by means of which abrasive-coated material belts may be drawn from a roll thereof by means of a gripping carriage means almost any predetermined distance through the skiving machine and then skived and severed and ejected and stacked automatically. One or both ends of the belts may be skived in order to produce a suitable overlap and a suitable area for bonding the ends of the belt together to form an endless belt. In this way, with a single machine, essentially duplicate abrasive belts of lengths of 12 to 500 inches or even more, if desired, can be produced automatically.

For a better understanding of the present invention, reference may be had to the accompanying drawings, in which:

FIGURE 3 is a front elevational view of a portion of the apparatus;

FIGURE 5 is a perspective view of the belt cutting mechanism of the skiving apparatus shown on larger scale; and FIGURE 6 is a schematic wiring diagram for the apparatus.

Figure 1:
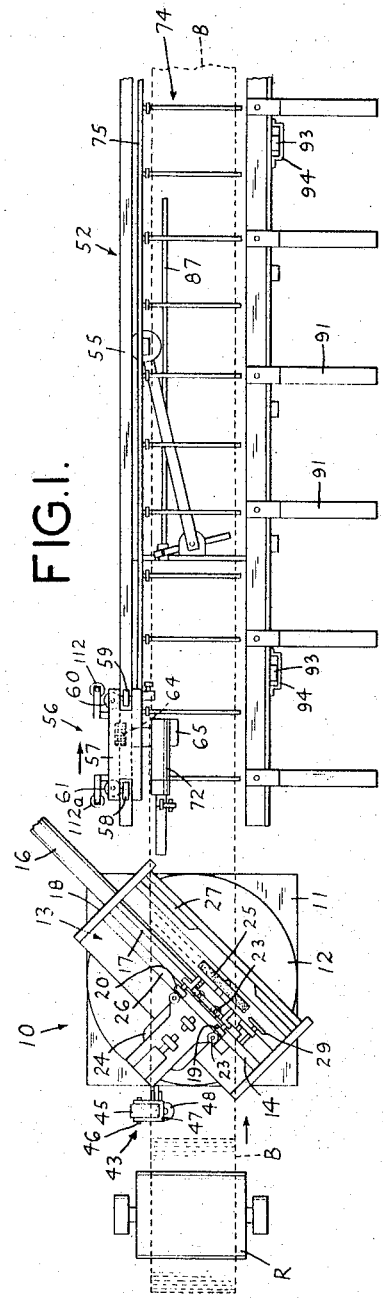
FIGURE 1 is a plan view of the feeding, skiving and cutting section of a typical machine embodying the present invention shown partially broken away.

For purposes of illustration, the new apparatus is disclosed as including a belt skiving grinder 10 of the type disclosed in the Ackerman U.S. Patent No. 3,090,167 dated May 21, 1963. This application includes a supporting platform 11 on which is mounted an adjustable turntable 12 to enable the belt to be skived and cut at substantially any desired angle, for example, at about 45° as shown in FIGURE 1. Extending upwardly from the turntable 12 is a frame 13 carrying a guide rail 14 on which is mounted a carriage 15 for movement lengthwise along the guide rail by means of an air cylinder 16 and piston rod 17. The air cylinder may be conveniently mounted on an upright 18 of the frame 13. The carriage 15 is provided with rollers 19 and 20 which bear against the upper edge of the guide rail 14. Horizontally disposed pairs of rollers 23 engage opposite sides of the guide rail to prevent lateral movement and chattering of the carriage. Mounted on the carriage is an electric motor 24 which drives a grinding wheel 25 by means of which the abrasive grains on the belt B are removed. As explained more particularly in the Ackerman Patent No. 3,090,167, the carriage is provided with means whereby the abrasive wheel 25 can be raised and lowered and also moved axially in order to grind the abrasive grains from the belt along two parallel zones and to different depths to provide transverse zones at opposite ends of each belt suitable for receiving a bonding adhesive enabling the ends of the belts to be joined thereby at a lap zone of about the same overall thickness as the remainder of the belt.

In accordance with the present invention, the grinding wheel is operated to remove abrasive grains along one zone during a forward movement of the wheel, that is, downwardly and to the left as viewed in FIGURE 1, and then be raised and moved back to the right out of contact with belt. The apparatus is also provided with clamping means, such as the rails 26 and 27 shown schematically in FIGURE 1, for holding the belt B in position during the skiving operation. This feature also is shown in the Ackerman patent supra.

In accordance with the present invention, the Ackerman skiving apparatus is provided with a cutting mechanism 28 which is adapted to sever the belt B along a line substantially co-incident with the rear edge of the abrasive wheel 25, as best shown in FIGURE 1. The cutter 28 includes a steel disk knife 29 mounted on a shaft 30, as shown in FIGURES 3 and 5, which is clamped in an arm 31. A laterally extending shaft 32 at the inner end of the arm and parallel with the cutter axis is received in a bearing block 33 which is carried by a downwardly extending standard 34 fixed to the underside of the carriage 15 in front of the motor 24. If desired, the bearing block 33 can be fixed to the motor housing.

An air cylinder 35 is pivotally supported by a shaft 36 received in a bearing 37 fixed to the carriage 15. At the upper end of the air cylinder 35 and mounted on the shaft 36 is a roller 38 which bears against the lower edge of the guide rail 14 so that reaction forces are exerted against the guide rail and do not displace the carriage itself.

The piston 39 of the air cylinder is connected by means of a yoke 40 to the end of the shaft 30 on which the cutter 29 is mounted, thereby enabling the cutter to be raised and lowered by means of the air cylinder. In the operation of the skiving and cutting apparatus thus far described, the air cylinder 16 causes the carriage to move from right to left, as viewed in FIGURE 3, with the skiving wheel 25 in contact with the belt to grind the abrasive grains therefrom along a narrow zone inclined at an angle to the belt. Upon reaching the left-hand end of its travel, the abrasive wheel is raised and the cutter 29 is lowered so that upon the return movement of the carriage to the right, the belt is cut leaving the skived zone on the trailing end of the belt which has been cut off. As shown in FIGURES 1 and 3, the belt may be supplied in rolls R of any desired length, and means is provided for advancing the belt through the skiving apparatus and removing the cut lengths after they have been skived. To that end, between the support 42 for the roll R and the skiving apparatus 13 is a belt-advancing device 43. This device includes a generally L-shaped arm 44 having a laterally extending jaw 45 fixed thereof which is adapted to extend over the belt B. Underlying the belt B and connected to the jaw 45 by means of a pivot 46 is a jaw 47 which can be pivoted into and out of clamping engagement with the belt by means of an air cylinder pivotally mounted on the arm 44 and a piston pivotally connected to the jaw 47. The arm 44 as a whole is mounted for pivoting movement in a vertical plane on a pivot member 49 and is rocked in that plane by means of an air cylinder 50 in timed relation to the operation of the skiving and cutting device. The action of the belt-advancing device 43 will be described in greater detail hereinafter.

Figure 4:
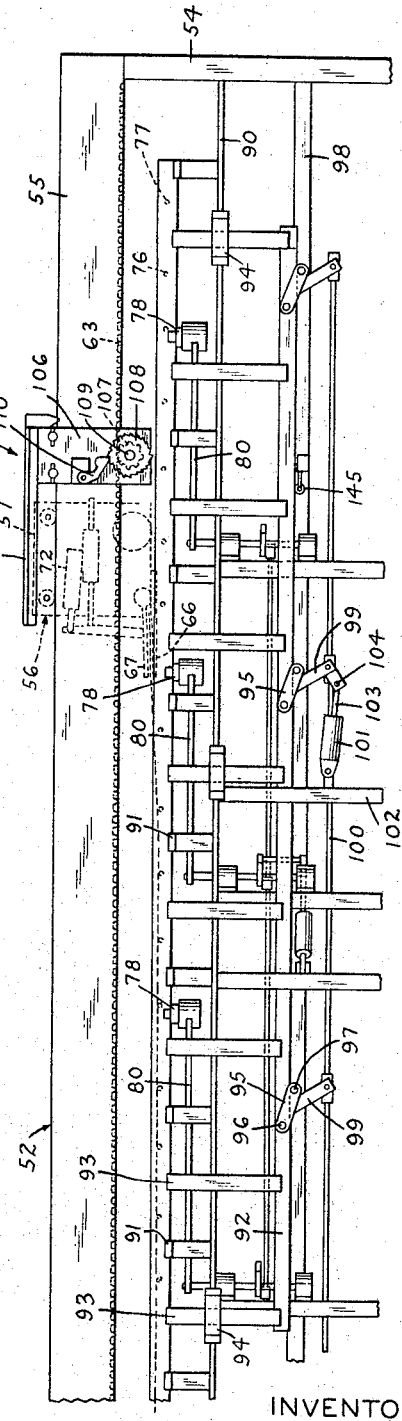
FIGURE 4 is a front elevational view of the belt unloading and stacking section of the apparatus.

At the right-hand side of the skiving and cutting apparatus 10, is a belt feeding, measuring and stacking device 52 of novel type. The device 52 includes a frame 53, FIGURES 1 and 3, of generally rectangular shape supported in a substantially horizontal plane by means of a plurality of legs 54 along the length thereof. One side 55 of the frame consists of a guide rail of generally rectangular cross-section which extends throughout the full length of the frame and may be made as long as or longer than the maximum length of the abrasive belts being produced. Movable lengthwise of the guide rail 55 is a belt gripping and withdrawing device 56 including a supporting carriage 57 provided with vertically disposed rollers 58 and 59 and horizontally disposed rollers 60 and 61 which guide and support the carriage for movement along the guide rail 55. As best shown in FIGURES 3 and 4, the lower edge of the guide rail 55 is provided with a toothed rack 63 with which meshes a gear 64 driven by a reversible air motor 65 mounted on the carriage and utilized to move the carriage lengthwise along the guide rail 55 in either direction.

Projecting toward the skiving apparatus from the lower edge of the carriage 57 is a fixed gripping jaw 66 whcih cooperates with a pivotally movable gripping jaw 67 to grip the leading end of the abrasive belt and pull the belt through the skiving apparatus a predetermined distance determining the length of the belt being made. As shown in FIGURE 3, the jaw 67 is connected by means of a pivot 69 to the carriage 57 and is moved in a clockwise or counterclockwise direction by means of a lever 70 which is pivotally connected to the piston rod 71 of an air cylinder 72 mounted on the carriage 56.

In order to support the length of belt which is withdrawn by the jaws 66 and 67 upon movement of the carriage 56 to the right, the frame 53 is provided with a rake-like belt receiver 74 including a longitudinally extending bar 75 provided with a plurality of spaced-apart rods or teeth 76, 77. The bar 75 is provided with a plurality of downwardly extending pivot members 78, 79 and so forth which are rotatably received in angularly inclined lever arms 80, 81 and so forth, which are, in turn pivotally mounted at their left-hand ends on brackets 83, 84 on cross members 85 of the frame 53. The levers form a parallelogram suspension for the belt receiver 74. It will be apparent that the receiver 74 including the bar and rods 76 and 77 thereon can be moved transversely of the frame 53 by swinging movement of the arms 80, 81. Each of the arms 80, 81, etc., is fixed to a separate lever arm 86, these lever arms being pivotally connected to a link 87. The opposite end of one of the arms 86 is connected to the piston rod 88 of an air cylinder 89 which is pivotally mounted on the front frame element 90 of the frame 53. In this way, by actuation of the air cylinder, the receiving member 74 can be swung outwardly over the receiving bars 91 which extend outwardly from and are fixed to the front frame member 90 and retracted to the position shown in FIGURE 2.

Assuming that the receiving member 74 carries an abrasive belt, it can be swung by the air cylinder 89 to dispose the belt above the receiving bars 91. The belt is discharged from the receiving member 74 onto the bars 91 by means of a vertically reciprocal ejecting mechanism, including a horizontal bar 92 having upwardly extending fingers 93 along its length carried slidably by and movable vertically in guides 94 on the front of the frame member 90. The lower ejecting frame rail 92 is supported by a plurality of parallel levers 95 which are connected by means of pivots 96 to the rail 92 and by pivots 97 to a rail 98 fixed to and extending lengthwise of the frame. A downwardly extending arm 99 on each link is pivotally connected to a longitudinally extending link 100 which can be reciprocated endwise by means of an air cylinder 101 connected to a frame upright 102 and having its piston rod 103 pivotally connected to an extension 104 on the arm 99. Upon actuation of the air cylinder 101, the ejecting fingers can be raised so that their upper ends extend above the level of the receiving frame 74 or retracted below the receiving frame.

Figure 2:
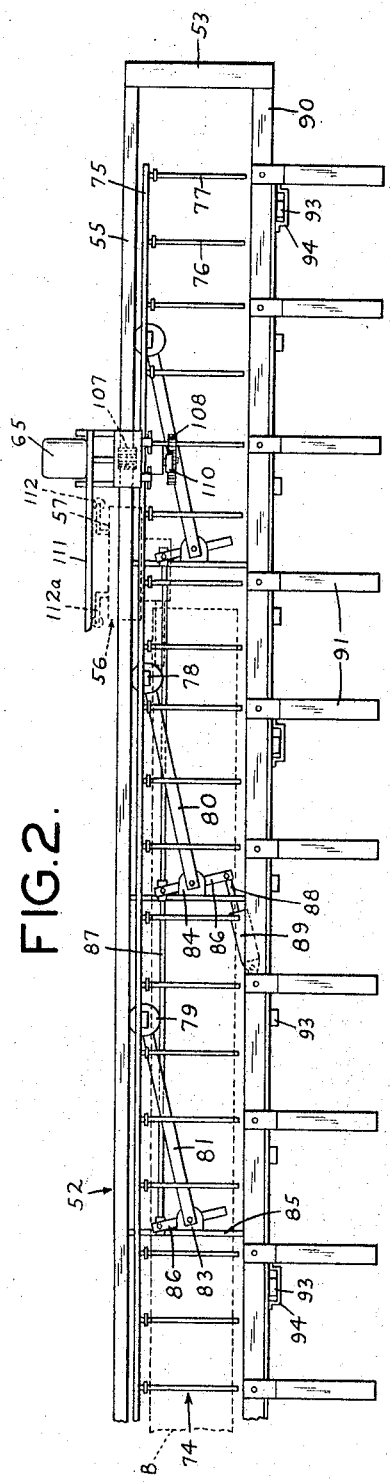
FIGURE 2 is a partial plan view of the belt feeding and discharging apparatus section of the apparatus.

With the belt and the frame 74 superimposed over the receiving arms 91, the ejecting frame 92 is raised behind the belt and when the receiving frame 74 is moved to the position shown in FIGURE 2, the belt is stripped from it and dropped onto the receiving arms 91, after which the ejecting fingers 93 are retracted below the level of the receiving frame 74.

The length of the belt being skived and cut is controlled by means of a stop or control mechanism 105 mounted on the guide rail 55. The control mechanism includes a carriage 106 slidable along the guide rail and including a freely rotatable gear 107 mounted on the carriage 106 and meshing with the rack 63. A ratchet wheel 108 is fixed to the shaft 109 journalled in the carriage which supports the gear 107 and cooperates with a pawl 110 pivotally mounted on the carriage 106 to resist movement of the carriage 106 to the right. The pawl 110 can be retracted to enable the carriage 106 to be positioned any place along the length of the rail 55. Extending from the top edge of the carriage 106 is a control and stop bar 111 which is adapted to engage a control member 112 of a roller type a shut off air valve which when engaged by member 111 shuts off the full flow of air to the motor in that direction through unrestricted pipe and thereby switches the air flow through a flow control restricting valve so that air motor 65 slows down prior contact with stop 105. A similar control member 112a is provided to have the same slow-down effect on the carriage when moving to the left. A double acting shock absorber 113 is mounted on the carriage 106 to cushion the shock of stopping the carriage at each end of its path.

In the operation of the machine, the leading end of the belt B is withdrawn from the roll and fed through the clamping means of the skiving apparatus 10 and beneath the skiving wheel 25 and cutter 29 which are at the right-hand end of the guide rail 14. The belt is also fed between the jaws 45 and 47 of the feeding device 43. The skiving motor 22 is then started and the operating cycle is initiated. As the operating cycle begins, the clamps 26 and 27 of the skiving apparatus come down holding the belt in place. The carriage 15 then moves across the rail, skiving a band across the belt on the movement and on the return stroke, cutter 29 is lowered to cut off the portion of the belt extending to its right and having the skived band on its trailing end. At the beginning of an operation, this belt portion will be a relatively short piece or scrap of material. Following this operation, the receiving frame 74 is moved by the air cylinder 89 outwardly to a position overlying the receiving arms 91, FIGURE 2. In this position, the ejecting fingers 93 will be raised behind the scrap of material and the air cylinder 89 will again be actuated to move the receiving member 74 back to the position shown in FIGURE 2 to drop the scrap of material onto the receiving arms 91 from which it is removed and discarded. The clamps 26 and 27 are then raised to release the belt. Thereafter, the feeding mechanism 43 will be actuated by the air cylinder 48 to close the jaws 45 and 47, grip the edge of the belt B to the left of the skiving apparatus 10 as viewed in FIGURE 1, and then is rocked clockwise by the air cylinder 50 to push the leading edge of the belt beyond the hold-down rail 27 in a position to be engaged by the jaws 66 and 67 on the carriage 56 without interference.

The jaws 66 and 67 are then closed to grip the leading edge of the belt, the jaws 45 and 47 are opened and the air motor 65 is energized to move the carriage 56 along the guide rail 55 a distance determined by the position of the stop mechanism 105. When the actuator 112 or actuators on the carriage 57 engage the control rail or bar 111, the carriage 57 is brought to a stop and the jaws 66 and 67 open, releasing the leading end of the belt. The above-described cycle is then repeated in the sequence indicated above so that belts of a length determined by the position of the stop mechanism 105 are skived and cut one after another and stacked on the receiving arms 91.

Any suitable interlocking or sequence timing system can be utilized for operating the apparatus in the sequence indicated above. Thus, the movement of the skiving carriage may be utilized to actuate microswitches to control air valves which sequentially actuate the belt advancing mechanism 43, the receiving and discharging air motor 89 and the ejecting air motor 101 and carriage motor 65. Movement of the receiving frame 74 may actuate microswitches or air valves to control flow of air to the air cylinder 101 so that the ejecting fingers will rise and retract in timed relation to the movement of the receiving frame 74. In this way, the only adjustment of the apparatus required for cutting belts of any length which can be received by the receiving frame 74 is the adjustment of the stop member 105 along the frame rail 55.

FIGURE 6 discloses a typical wiring system for actuating the skiving and cutting machine sequentially. In the wiring diagram, only the solenoid windings for the air control valves are shown, these valves being of a type in which energization of a solenoid shifts the valve in one direction, either open or closed, and upon de-energization leaves the valve in either its open or closed position. The use of such valves simplifies the circuitry, inasmuch as it provides mechanically for a holding action admitting air to cause the operation of its corresponding air cylinder or air cylinders in one direction.

In the wiring diagram, the main power panel is 115 by means of which the various solenoid coils described hereinafter are connected to a main power source with a main operation switch interposed between the power source and the panel 115. As illustrated, the power supply is direct current, although alternating current may be used equally well.

With the circuit components in the position shown in FIGURE 6, when the main operation switch is closed, the clamps 26 and 27 (FIGURES 1 and 5) close and thereby close a switch 116 which is connected by means of the conductor 117 to the solenoid coil 118 of the air valve which supplies air to the right-hand end of the cylinder 16. The coil 118 is connected by means of conductor 119 and switches 116, 120 to the other terminal of the power source. As air is supplied the cylinder 16, the carriage carrying the skiving wheel 25 is caused to move across the belt, removing the abrasive grains along a narrow diagonal path. As the carriage starts its movement, the switch 120 is opened. When the skiving wheel reaches the end of its path, the carriage 15 engages and closes the switch 121. With the switch 121 closed, power is supplied through the conductor 122, switch 121, conductor 123 to the solenoid coil 124 and the conductor 125 to ground, thereby supplying air to the cylinder (not shown) which raises the skiving wheel or alternately shifts it laterally and raises it slightly and also supplies air to the cylinder 35 which lowers the knife 29. Upward movement of the motor causes it or the support therefor to close a microswitch 126 on the carriage 15 which energizes the solenoid coil 127 of the air valve which supplies air to the opposite end of the cylinder 16 and causing the carriage 15 to move back across the belt and causing the belt to be cut by the knife. Closing of the switch 126 also supplies air to the cylinder 72 which opens the feed clamps 66 and 67 on the feed carriage 56.

As shown in the diagram, the switch 126 is connected to ground by means of the conductor 128, by the conductor 129 to one terminal to the solenoid coil 127. The opposite terminal is connected by means of the conductor 130 to the power source at the power panel 115. Also, the positive terminal of the switch 126 is connected by means of the conductor 131 to one terminal of the solenoid coil 132 for the valve which supplies the air to the feed clamps 66 and 67, the opposite terminal of the coil 132 being connected by the conductor 133 to the main power panel 115. Upon completion of the return movement of the carriage 15 and cutting of the belt, the skive motor carriage actuates the switch 134 causing the motor and skiving wheel 25 to be shifted laterally to its original position, supplies air to the cylinder 35 to lift the knife 29, and also supplies air to raise the clamps 26 and 27. In the circuit, the solenoid coils 135, 136 and 137 are energized by closing of the switch 134 as follows: one terminal of the coil is connected by the conductor 138 to the panel 115, and the other terminal is connected by conductor 139 to the positive terminal of the switch 134, its other terminal being connected by conductor 140 to ground. Positive terminal of the switch 134 is connected by conductor 141 to coil 136, the other end of the coil being connected to the power panel 115 by conductor 142. One terminal of coil 137 is connected to the positive terminal of the switch 134 by conductor 143 and the other terminal of coil 137 is connected by conductor 144 to the power panel 115.

Coil 135 activates an air valve to supply air for shifting the skiving motor to its starting position.

Coil 136 activates an air valve to supply air to the cylinder for raising the clamps 26 and 27 to release the severed belt and the abrasive band from which the belt is cut.

Coil 137 activates an air valve to supply air to the cylinder 101 to lower the ejecting fingers 93. As the ejecting fingers 93 reach the bottom of their movement, they actuate mechanically an air valve 145 (FIGURE 4) which supplies air to the cylinder 89 to cause the receiving frame 74 to move out over the receiving fingers 91. When the receiving frame reaches its outermost position, it closes switch 146 (FIGURE 6) completing circuits through two solenoid coils 147 and 148, as follows:

Conductor 149 connects the power panel 115 to one terminal of the solenoid coil 147 and conductor 150 connects the other coil terminal conductor to the movable contact of the switch 146 and through conductor 151 to ground. The movable contact of the switch 146 is also connected by means of a conductor 152 to one terminal of the coil 148, the other terminal being connected by conductor 153 to the power panel 115. Accordingly, when the switch 135 is closed, both coils 147 and 148 and the corresponding air valves are actuated to produce the following movements. Air is supplied by the air valve controlled by the coil 148 to supply air to the cylinder 101 to raise the ejecting fingers 93 behind the belt on the receiving frame 74. In the elevated position, the air valve 145 is actuated to supply air to the opposite end of the cylinder 89 to retract the receiving frame 74, thereby sliding the belt onto the receiving fingers 91.

The solenoid coil 147 actuates an air valve supplying air to the air motor 65 for moving the feed carriage 57 to the left as viewed in FIGURES 1 to 4. The air valve 112a is interposed in the fluid circuit so that as the carriage approaches the end of its travel to the left, air flow is decreased and the movement of the carriage is stopped, with the jaws 66 and 67 in a position to grip the end of the belt. During movement of the carriage to the left, air is supplied by the air valve controlled by the coil 148 to actuate the cylinder 50 and thereby move the feeder 43 from its dotted line position as shown in FIGURE 3 to its full line position to advance the cut edge of the belt sufficiently from beneath the clamps 26 and 27 to enable the feeding jaws 66 and 67 to engage it. As the carriage 56 reaches the end of its leftward travel, it closes the switch 155 which connects the solenoid coil 156 of the air valve which supplies air to the cylinder 72 causing the feeding jaws 66 and 67 to close. The switch 155 is interposed between ground and one terminal of the coil 156 while the other terminal of the coil is connected by means of conductor 157 to the main control panel.

As the jaws 66 and 67 close on the end of the abrasive belt, they close switch 158 which energizes the solenoid coil 159 through the conductors 160, 161 and 162. The air valve controlled by the coil 159 supplies air to the cylinder 48 of the feeder 43 causing the jaws 45 and 47 to open and opening of the jaws 46 and 47 closes the switch 163 which through conductor 164 energizes the solenoid coil 165 having its opposite terminal connected by means of conductor 166 to ground. Coil 165 actuates an air valve to supply air to the air motor 65 causing the carriage 57 to move to the right, pulling the abrasive coated material through the skiving machine a distance determined by the position of the stop member 105. As the carriage passes the arm 111 on the stop member, the air valve 112 is actuated to reduce the flow of air to the motor 65, causing it to slow down and finally to stop. At the same time, the solenoid coil 165 activates an air valve to supply air to the cylinder 50 to move the feeder 43 to the dotted line position shown in FIGURE 3. When the feed carriage 56 reaches the stop mechanism, switch 167 is closed which supplies electrical energy to the solenoid coils 168 and 169. The coil 168 actuates an air valve to supply air to the air cylinder for causing the clamps 26 and 27 to move downwardly. The coil 168 is connected to the main panel by the conductors 170, 171 and 172 to ground when the switch 167 is closed. The movable contact of the switch 167 is connected by means of the conductor 173 to one terminal of the coil 169, the other terminal being connected by the conductor 174 to the main power panel. When the coil 169 is energized, air is supplied to the cylinder 48 to cause the jaw 47 on the feeder to close. With the components of the apparatus in these positions, the above-described cycle is repeated so long as the main operation switch is closed.

It will be understood that the above-described apparatus is illustrative of the invention and many variations and modifications can be made therein without departing from the invention. Accordingly, it should be understood that the invention is limited only as defined in the following claims.

I claim:

1. Apparatus for skiving and cutting abrasive belts comprising a supporting member for supporting a strip of abrasive coated material, a carriage mounted above said supporting member for movement transversely thereof, a motor-driven skiving wheel mounted on said carriage for removing abrasive from said strip, a cutter mounted on said carriage for cutting said strip transversely to form successive belts, a belt-receiving member in alignment with said supporting member, gripping means movable lengthwise of said belt-receiving means for engaging the leading end of said strip and pulling it over said supporting member onto said belt-receiving member, and means for ejecting a cut belt from said belt-receiving member.

2. The apparatus set forth in claim 1 comprising means on said carriage for raising and lowering said cutting means to cut said strip after abrasive has been removed from said strip by said wheel.

3. The apparatus set forth in claim 1 comprising a support for a roll of said abrasive-coated strip to be supplied to said supporting member, feeding means between said support and said supporting member engageable with said strip for advancing said strip endwise across said supporting member for engagement by said gripping means after a belt has been cut from said strip.

4. The apparatus set forth in claim 1 comprising a rail extending transversely of said supporting member for mounting said carriage, a fluid-activated motor on said carriage for raising said cutter out of engagement with said strip and lowering said cutter into engagement and said strip to cut it transversely, and means on said motor engaging said rail for resisting upward movement of said motor and cutter while said strip is being cut.

5. The apparatus set forth in claim 1 in which said belt-receiving member is substantially horizontally disposed, means for supporting said belt-receiving member for transverse movement in a substantially horizontal plane, and said means for ejecting a cut belt comprises a substantially vertically movable member, and means for moving said belt-receiving member and said ejecting means in timed relation to move said belt-receiving member from a first position transversely to a second position while carrying a cut belt, move said vertically movable member upwardly behind said belt on said belt-receiving member in said second position, move said belt-receiving member back to said first position to strip said belt therefrom and move said vertically movable member downwardly out of the path of said belt-receiving member.

6. Belt skiving and cutting apparatus comprising a platform for receiving a strip of abrasive-coated material, a rail mounted above said platform and extending transversely of said platform and strip, a carriage mounted on said rail for movement therealong, means for reciprocating said carriage lengthwise of said rail, skiving means on said carriage for removing abrasive from said strip during movement of said carriage along said rail, a cutter movably mounted on said carriage, a cylinder having a reciprocable connecting rod mounted on said carriage, said connecting rod being connected to said cutter for lowering said cutter against said strip to cut it during movement of said carriage along said rail in one direction and raising said cutter out of engagement with said strip during movement of said carriage in the opposite direction, and thrust means on said cylinder engaging said rail for resisting upward movement of said cylinder and said carriage while cutting said strip.

7. The apparatus set forth in claim 6 in which said skiving means comprises a motor-driven abrasive wheel having front and back faces and a grinding edge and said cutter is disposed substantially in the plane of one of said faces of said grinding wheel.

8. Apparatus for cutting and skiving abrasive belts comprising means for removing abrasive from a zone extending transversely of a strip of abrasive-coated material, means for cutting said strip transversely along one edge of said zone to form an abrasive belt, a belt-receiving member having a plurality of spaced-apart elements for receiving said cut abrasive belt, means supporting said belt-receiving member for movement substantially horizontally with said spaced-apart elements in substantially a horizontal plane between a first position in alignment with said strip and a second position out of alignment with said strip, an ejecting member having a plurality of vertically extending ejecting fingers, means supporting said ejecting member for vertical movement between a position in which the upper ends of said ejecting fingers are above said spaced-apart elements and a second position below said spaced-apart members, and motors for moving said belt-receiving member and said ejecting member to move successively said belt-receiving means to said second position, said ejecting member to said first position, said belt-receiving member to said first position and said ejecting member to said second position.

9. The apparatus set forth in claim 8 comprising a guide rail extending lengthwise of said belt-receiving member, a carriage movable along said rail toward and away from said skiving and cutting means, gripping means on said carriage for engaging an end of said strip, means for moving said carriage away from said cutting means to lay said strip on said belt-receiving member prior to skiving and cutting said strip to form a belt and adjustable means on said guide rail for limiting movement of said carriage along said guide rail to form belts of predetermined lengths.

10. Apparatus for cutting and skiving abrasive belts comprising means for removing abrasive from a zone extending transversely of a strip of abrasive-coated material, means for cutting said strip transversely along one edge of said zone to form an abrasive belt, a belt-receiving member for receiving said cut abrasive belt, a guide rail extending lengthwise of said belt-receiving member, a carriage movable along said rail toward and away from said skiving and cutting means, gripping means on said carriage for engaging an end of said strip, means for moving said carriage away from said cutting means to lay said strip on said belt-receiving member prior to skiving and cutting said strip to form a belt and adjustable means for limiting movement of said carriage along said guide rail to form belts of predetermined lengths.

References Cited

UNITED STATES PATENTS

| | | | |
|---|---|---|---|
| 393,238 | 11/1888 | Johnson | 144—37 |
| 1,906,739 | 5/1933 | Carruthers | 51—5 |
| 2,309,305 | 1/1943 | Dahlstrom et al. | 51—188 |
| 3,058,868 | 5/1962 | Schroeder | 156—153 |
| 3,090,167 | 5/1963 | Ackerman | 51—34 |

ROBERT C. RIORDON, *Primary Examiner.*

J. A. MATHEWS, *Assistant Examiner.*